June 3, 1952
M. BATIUK ET AL
2,599,360
HEATING DIELECTRIC MATERIALS AND APPARATUS THEREFOR
Filed Dec. 16, 1948
2 SHEETS—SHEET 1
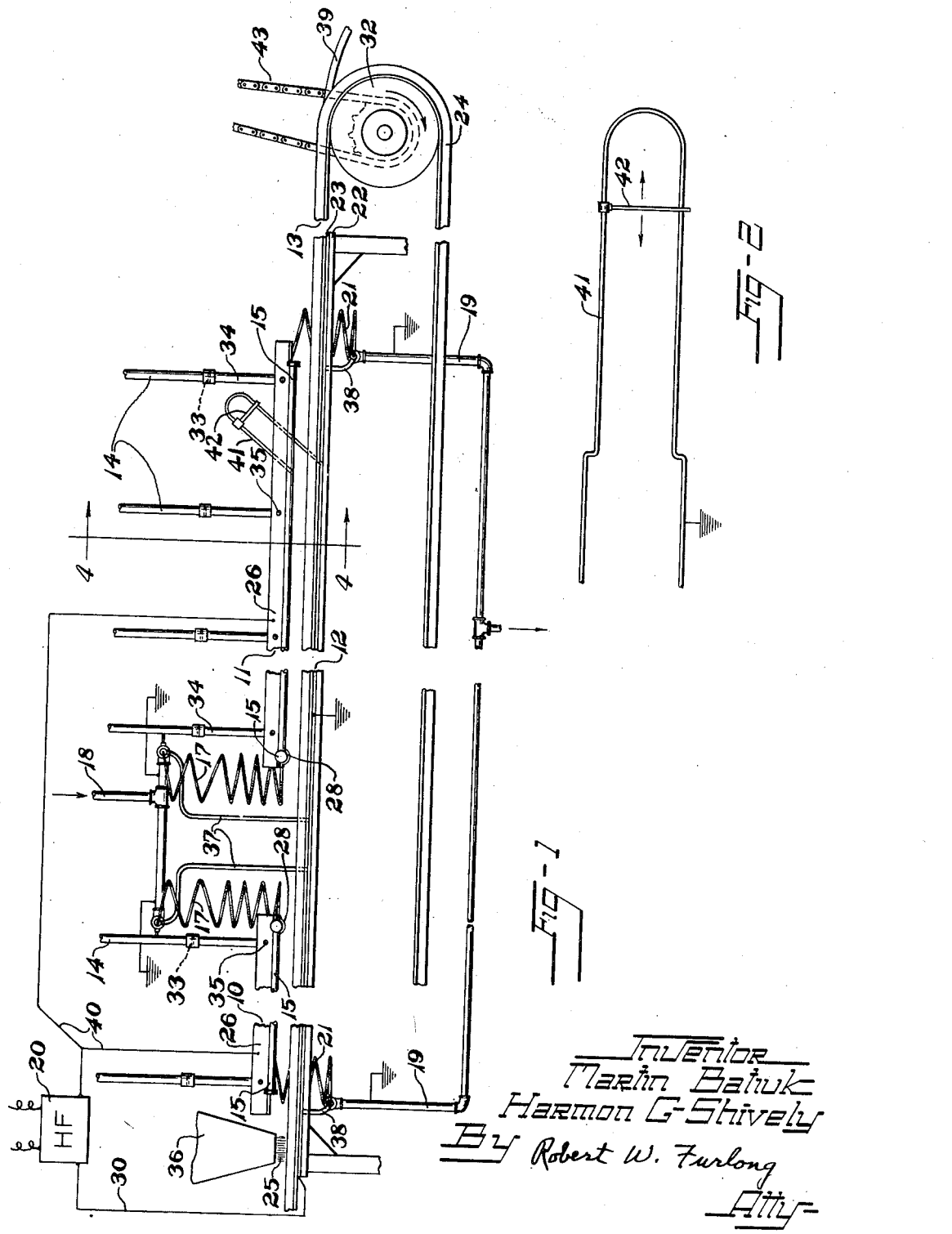
Inventor
Martin Batiuk
Harmon G. Shively
By Robert W. Furlong
Atty June 3, 1952 M. BATIUK ET AL 2,599,360
HEATING DIELECTRIC MATERIALS AND APPARATUS THEREFOR
Filed Dec. 16, 1948 2 SHEETS—SHEET 2
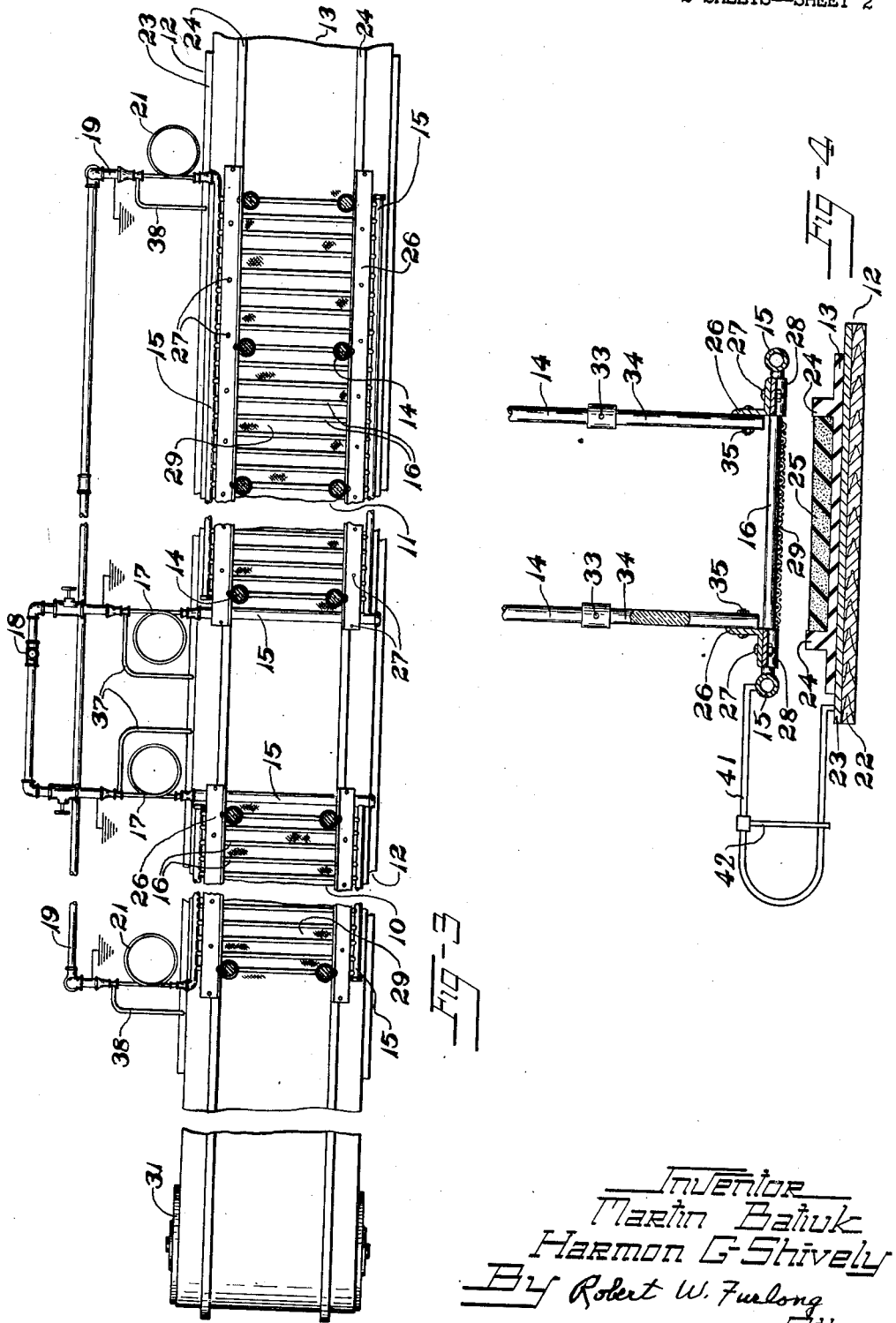
Inventor
Martin Batiuk
Harmon G. Shively
By Robert W. Furlong
Atty Patented June 3, 1952

2,599,360

UNITED STATES PATENT OFFICE 2,599,360

HEATING DIELECTRIC MATERIALS AND APPARATUS THEREFOR

Martin Batiuk and Harmon G. Shively, Akron, Ohio, assignors to The B. F. Goodrich Company, New York, N. Y., a corporation of New York Application December 16, 1948, Serial No. 65,604

9 Claims. (Cl. 219—47)

This invention relates to heating a dielectric material by the use of a high frequency alternating electrostatic field and particularly to the heating of a liquid-containing material such as a vulcanizable foamed rubber latex.

It is an object of this invention to provide a method and apparatus for heating uniformly a dielectric material which releases a liquid or a vapor when heated.

It is a further object to provide a method and apparatus for heating such a material while it is advancing continuously through a high frequency alternating electrostatic field.

In addition, it is an object of this invention to further increase the number of possible applications of a high frequency electrostatic field for heating dielectric materials.

Heretofore attempts to heat liquid-containing materials, and especially those materials which evolve a large quantity of moisture when heated by means of a high frequency alternating electrostatic field have met with many difficulties.

When heating such a material as an aqueous dispersion of rubbery material, for example foamed latex, a great quantity of water is driven off in the form of water vapor. The surrounding air then becomes heavily laden with moisture which will of course condense on any cool surface such as that of the electrodes employed to create the electrostatic field, interfering with their proper functioning. Water dripping from the electrode will result in arcing of the high frequency current along the path of the falling drops of water with a resulting burned spot in the material being heated. In addition, if the drop of water strikes the material being heated it tends to cool it locally, resulting in uneven heat treatment.

The heating method and apparatus herein disclosed may be used in heating any material which might release a liquid, vapor, or gas when heated. However, to illustrate the invention a detailed description of heating a vulcanizable foamed rubber latex will be given.

In Fig. 1 a side elevation of the heating apparatus is shown;

Fig. 2 is a detailed view of a tuning stub with a shorting bar;

Fig. 3 is a plan view of the heating apparatus;

Fig. 4 is a sectional view along line 4—4 of Fig. 1.

The apparatus comprises basically a top electrode 10, 11 and a bottom electrode 12 for establishing a high frequency field; a conveyor belt 13 for introducing the material to be treated into the field; and a heating system for the top electrode. The top electrode is divided into two sections 10, 11 to provide greater flexibility in control of the temperature and rate of heating during the initial and final heating stages of the material. The top electrode 10, 11 is made of brass manifolds 15, 15 and brass connecting tubes 16, 16. Angle irons 26, 26 are secured to the assembled top electrode by means of bolts and nuts 27, 27 and clamping members 28, 28, the angle irons in turn being secured to insulators 34, 34 by means of bolts and nuts 35, 35. The insulators, which support the whole top electrode, are suspended from hangers 14, 14 by means of pins 33, 33. The clamping members also secure a fine mesh copper screen 29 against the lower side of the brass pipes 16, 16. Therefore the effective parts of the top electrode 10, 11 are the manifold pipes 15, 15, the brass connecting pipes 16, 16 and the copper diffusion screen 29. The distance between the electrodes may be varied. The manifolds 15, 15 are connected through choke coils 17, 17 to a steam inlet line 18. The outlet line 19 also is connected to the manifolds 15, 15 by choke coils 21, 21. The inlet line 18 and the outlet line 19 of the steam system are grounded near the choke coil connections. The length of the choke coils 17, 17, 21, 21 is arranged so that the proper impedance is provided. In this way they serve to conduct the heating medium to and from manifolds 15 without permitting excessive loss of high frequency energy.

The outer ends of the choke coils 17, 17, 21, 21 are connected to the lower electrode 12 by copper straps 37, 37, 38, 38 in order to ground those points on the steam and condensate lines. The choke coils 17, 17, 21, 21 may be made of any metal which is a good conductor such as copper, silver, or brass. By using such metals which have low electrical resistance the power loss is kept correspondingly low. A flexible tube of rubber or other electrically resistant material may also be used since practically no current will flow through them and of course the power loss will again be low.

Another means of providing an impedance to the flow of the high frequency current through the steam inlet and outlet lines is shown in Fig. 2 in which a loop of tubing in the form of a tuning stub 41 is employed to replace the coil described above. The tuning stub 41 acts as a resonant section of a transmission line, and is provided with a shorting bar 42 slidable along the loop to permit variation in the resonance of the loop or stub. This tubing stub may be of any tubular, electroconductive material such as copper, silver, or brass. The shorting bar 42 may be of the same materials and is free to slide along the length of the loop to allow tuning to resonance with a particular frequency. This tuning stub 41 may be substituted for one or more of the choke coils 17, 17, 21, 21 to accomplish the same results; that is, the tuning stub will (1) convey the steam or condensate, and (2) act as an impedance to the flow of high frequency current through the steam line. If desired, both the tuning stub and a choke coil may be used in combination to achieve the desired effect. That is the tuning stub may be connected in parallel with the coil and tuned in the same way as is done when the tuning stub is used alone. When such a combination is used, either the tuning stub or the coil or both may carry the steam or steam condensate as the case may be.

The bottom electrode consisting of metal plate 23 is mounted on a wooden bench 22. An endless conveyor belt 13 having deckle strips 24, 24 is provided to carry the material to be heated between the opposing electrodes. Belt 13 may be made of fabric-reinforced rubber or any other suitable construction. The belt is mounted on roll 32 which is driven by chain and sprocket drive 43, and passes over idler roll 31 with its upper reach overlying bottom electrode 12 and in slidable contact therewith. A hopper 36 is positioned above one end of the belt 13 to deposit the unvulcanized foamed latex upon the belt uniformly. A source of high frequency alternating current, indicated diagrammatically at 20, is connected to the opposing electrodes by means of leads 30, 40.

In employing the apparatus of this invention for heating and vulcanizing foamed latex, the latex foam containing conventional compounding ingredients such as a gelling agent, vulcanizing agent, accelerator, etc. is deposited from hopper 36 upon the upper surface of belt 13 in a layer of substantially uniform thickness and is carried by the moving belt between the opposed electrodes. Steam is admitted from line 18 into the manifolds and tubes of top electrode 10, 11 to heat the electrode to a temperature at least about 5° F. above the temperature of the ambient atmosphere, or above the dew point of the atmosphere. A high frequency alternating electrostatic field is generated between top electrode 10, 11 and bottom electrode 12 by means of oscillator 20, the length of choke coils 17, 21 or the position of the shorting bar 42 on the loop or stub 41 being adjusted to minimize loss of electrical energy through the steam lines. As the foamed latex advances under the first section 10 of the top electrode it is heated to about 140° F. to cause the foam to gel; during this heating stage only a small proportion of the aqueous medium in the latex is evaporated. The gelled foam is then advanced on belt 13 under the second section 12 of the top electrode and is heated to about 210° F. During this second heating stage the foamed latex is vulcanized. The finished product 39 is stripped from the belt 13 at the driven roll 32.

Obvious variations and modifications may be effected within the spirit and scope of the invention as defined in the appended claims.

We claim:

1. In an apparatus for heating a dielectric material, a pair of opposed, spaced electrodes, one being an upper and the other a lower, said upper electrode comprising a pair of opposed manifolds with interconnecting tubes and an inlet and outlet, means for maintaining said dielectric material between and spaced from said electrodes, means for establishing a high frequency alternating electrostatic field between said electrodes, and means for passing a heating medium through said upper electrode to heat it above the temperature of the surrounding atmosphere comprising an impedance means connected in shunt relation between said opposed electrodes at each said inlet and outlet.

2. The apparatus of claim 1, wherein the impedance means comprises a choke coil of electroconductive tubing through which said heating medium passes.

3. Apparatus of claim 1 wherein the impedance means comprises a loop of electroconductive tubing through which said heating medium passes.

4. The apparatus of claim 3 in which means comprising a shorting bar slidable along said loop is provided to vary the impedance thereof.

5. Apparatus of claim 1 wherein the impedance means comprises a choke coil of electroconductive tubing in parallel with a loop of electroconductive tubing having a shorting bar slidable thereon to vary the impedance thereof.

6. Apparatus for progressively heating a dielectric material comprising a pair of opposed spaced elongated electrodes, conveyor means for advancing said dielectric material between and spaced from said electrodes, at least one of said electrodes comprising a pair of opposed manifolds with interconnecting tubes and an inlet and outlet, means for passing a heating fluid through said inlet, said manifolds, said interconnecting tubes and said outlet to heat said electrode, means for providing an impedance to the flow of high frequency current through the heating fluid inlet and outlet, said impedance means electrically connecting said opposed electrodes in shunt relation, and means for establishing a high frequency alternating electrostatic field between said electrodes.

7. Apparatus for progressively heating a liquid-containing dielectric material comprising a pair of opposed spaced elongated electrodes, one being an upper and the other a lower, means for establishing a high frequency alternating electrostatic field between said electrodes, conveyor means for advancing said dielectric material between and spaced from said electrodes, the upper electrode comprising a pair of opposed manifolds with interconnecting tubes and an inlet and outlet, and means for passing a heating fluid through said upper electrode with little loss of high frequency energy comprising a choke coil of tubing, through which said heating fluid passes, connected to each said inlet and outlet, each of said coils being electrically connected to said opposed electrodes in shunt relation.

8. Apparatus for progressively heating a liquid-containing dielectric material comprising a pair of opposed spaced elongated electrodes, one being an upper and the other a lower, means for establishing a high frequency alternating electrostatic field between said electrodes, conveyor means for advancing said dielectric material between and spaced from said electrodes, the upper electrode comprising an array of interconnected tubes having an inlet and outlet, and means for passing a heating fluid through said interconnecting tubes with little loss of high frequency energy comprising a loop of electroconductive tubing, through which said heating fluid passes, connected to each said inlet and outlet, each of said loops being electrically connected to said opposed electrodes in shunt relation.

9. Apparatus for progressively heating a liquid-containing dielectric material comprising a pair of opposed spaced elongated electrodes, one being an upper and the other a lower, means for establishing a high-frequency alternating electrostatic field between said electrodes, conveyor means for advancing said dielectric material between and spaced from said electrodes, the upper electrode comprising an array of interconnected tubes having an inlet and outlet, and impedance means through which heating fluid is introduced to and removed from said array of tubes with little loss of high frequency energy, said impedance means comprising a coil of electroconductive material, said coil electrically connecting said opposed electrodes at each said inlet and outlet, and at least one loop of electroconductive material provided with a shorting bar slidable along said loop electrically connecting said opposed electrodes in shunt relation.

MARTIN BATIUK.
HARMON G. SHIVELY.

REFERENCES CITED

The following references are of record in the file of this patent:

UNITED STATES PATENTS

| Number | Name | Date |
| --- | --- | --- |
| 2,304,958 | Rouy | Dec. 15, 1942 |
| 2,308,043 | Bierwirth | Jan. 12, 1943 |
| 2,428,615 | Brown | Oct. 7, 1947 |
| 2,452,365 | Frederick | Oct. 26, 1948 |
| 2,463,288 | Leguillon | Mar. 1, 1949 |
| 2,464,403 | Klingaman | Mar. 15, 1949 |
| 2,464,404 | Gillespie | Mar. 15, 1949 |

OTHER REFERENCES

Modern Plastics, June 1944, pages 116–118, 166 and 168.